Jan. 7, 1941.  F. C. PEARSON  2,228,016
THRUST BEARING AND MOUNTING THEREFOR
Filed Nov. 16, 1938  2 Sheets-Sheet 1

Inventor:
FRANK C. PEARSON,
by
His Attorney.

Jan. 7, 1941. F. C. PEARSON 2,228,016
THRUST BEARING AND MOUNTING THEREFOR
Filed Nov. 16, 1938 2 Sheets-Sheet 2
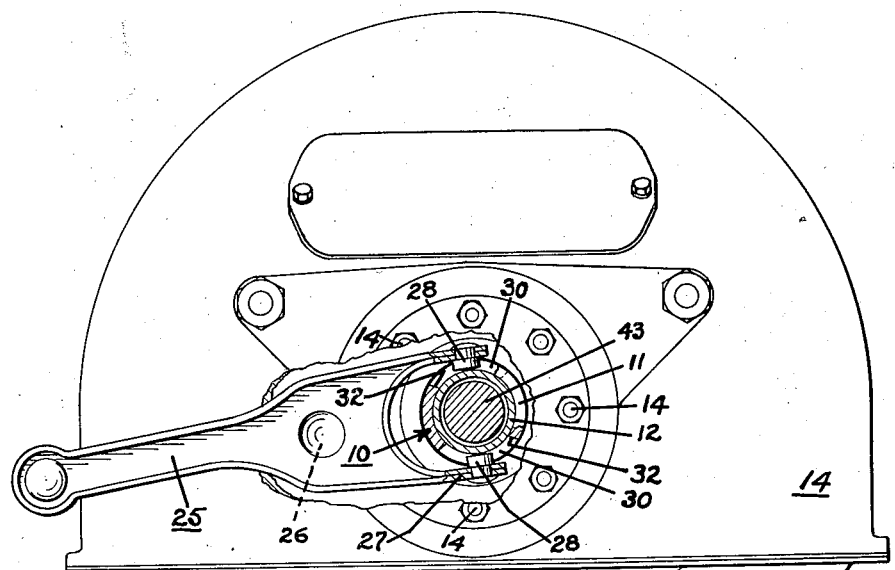
Fig. 3
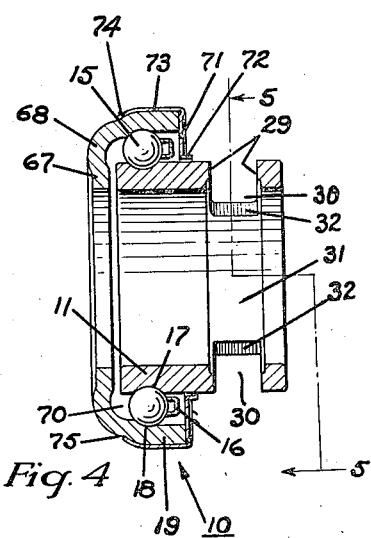
Fig. 4
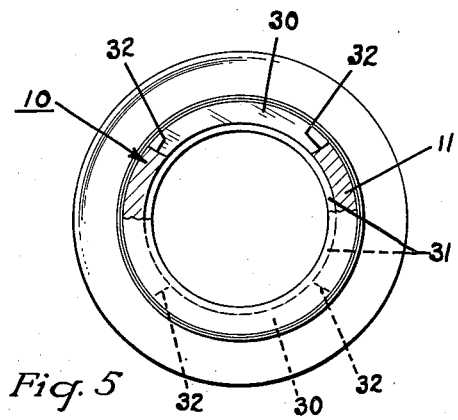
Fig. 5
Inventor:
FRANK C. PEARSON,
by
His Attorney.

Patented Jan. 7, 1941

2,228,016

UNITED STATES PATENT OFFICE 2,228,016

THRUST BEARING AND MOUNTING THEREFOR

Frank C. Pearson, Flushing, Mich., assignor to General Motors Corporation, Detroit, Mich., a corporation of Delaware Application November 16, 1938, Serial No. 240,758

4 Claims. (Cl. 192—110)

This invention relates to bearings and their mountings and particularly to an antifriction thrust bearing especially adapted for the release mechanism of a motor vehicle clutch.

An object is to provide an improved, simply constructed thrust bearing, such as a clutch release bearing which eliminates the need of the slidable sleeve that is commonly employed to support bearings of this type. A further object is to provide a unit-handling thrust bearing arranged for slidable movement on its support for directly connecting operating members, such as the shifting fork and release fingers of a clutch.

To these ends and also to improve generally upon devices of the character indicated, the invention consists in the various matters hereinafter described and claimed.

In the accompanying drawings:

Figure 3 is a fragmentary end view of the clutch mechanism taken substantially along the line 3—3 of Figure 1 and looking in the direction indicated by the arrows;

Figure 4 is an enlarged diametrical section through the clutch release bearing; and Figure 5 is an enlarged fragmentary end view of the bearing taken substantially along the line 5—5 of Figure 4 and looking in the direction indicated by the arrows.

Figures 1, 2:
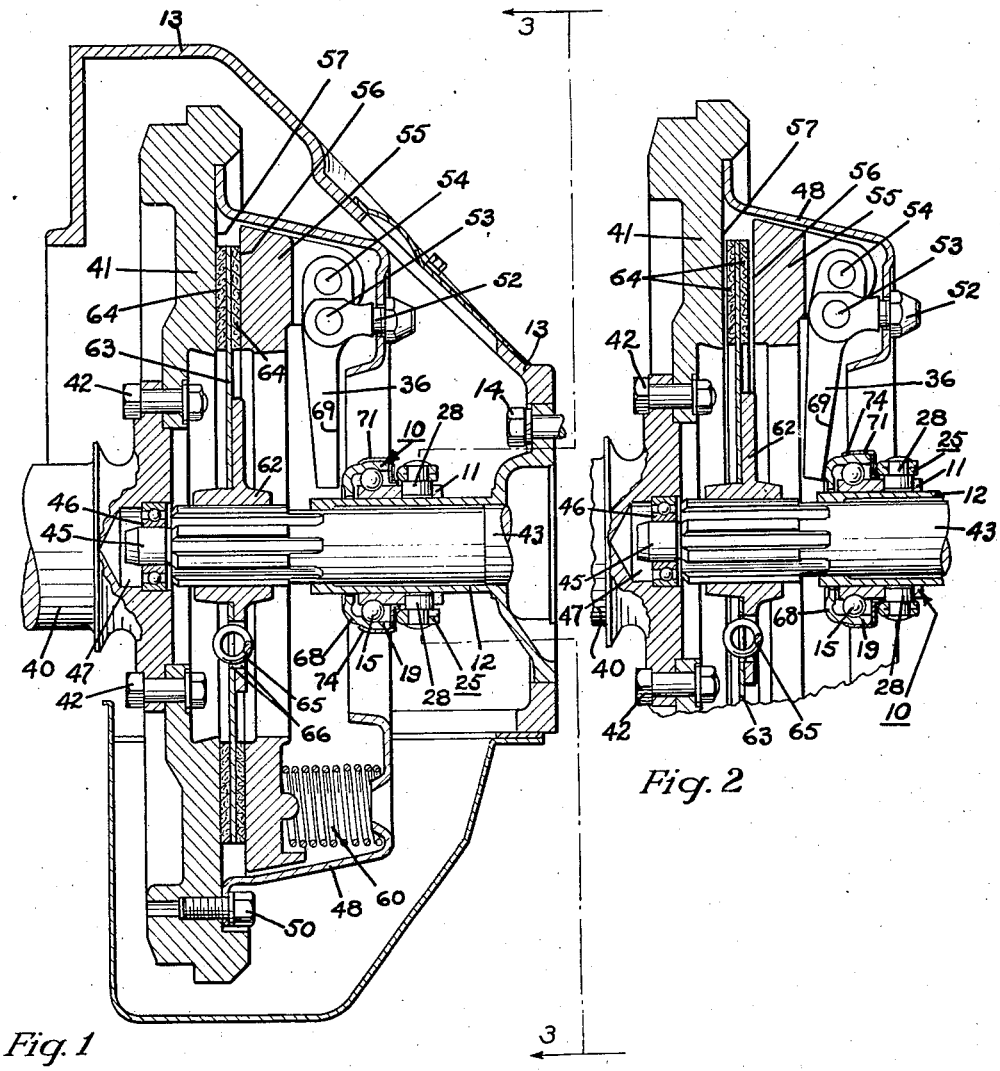
Figure 1 is a cross section taken through a clutch which embodies my invention and which illustrates the clutch in an engaged position.
Figure 2 is a fragmentary cross section generally similar to Figure 1, but showing the clutch in a disengaged position.

Generally stated, a thrust bearing 10, here illustrated in the form of a unit-handling clutch release bearing, has a cone race ring 11 axially slidable on a support, such as the hub 12, secured to the clutch housing 13 as by the bolts 14, and a row of spaced balls 15, guided by a suitable cage 16, roll on the cone raceway 17 and on the cup raceway 18 to rotatably support the bearing cup race ring 19. A shifting fork 25, pivotally supported as by the ball socket 26 secured to the housing 13, has an inner bifurcated end 27 provided with the inwardly directed opposed studs 28 which are slidably socketed between the side walls 29 of the substantially diametrically opposed arcuate slots 30 cut through the walls of the cone 11. The end walls 32 of the slots 30 are arranged to abut against the studs to prevent rotation of the cone 11, and a movement of the shifting fork 25 along the hub 12, as caused by a suitable member such as a foot pedal (not shown) moves the studs 28 in the slots 30 and axially shifts the thrust bearing as a unit to move the cup 19 into and out of operative engagement with the clutch operating fingers, one of which is shown at 36, to disengage and engage the clutch.

In the illustrated embodiment, an engine shaft 40, which extends into the housing 13, has a flywheel 41 secured to its rearward flanged end by the bolts 42, and a driven or output shaft 43, that extends through the hub 12, has a reduced forward end 45 supported by the antifriction pilot bearing 46 seated in the bore 47 in the rearward end of the engine shaft 40. An abutment plate 48, secured to the flywheel by the cap screws 50, carries a plurality of studs 52 spaced about the shaft 43, and each stud 52 supports a transverse pin 53 which pivotally supports one of the clutch operating fingers 36 for swinging movement towards and from the flywheel 41. Radially outwardly from each pin 53, each finger 36 is also pivoted by a pin 54 to an annular pressure plate 55 surrounding the shaft 43 and provided with a clutch engaging face 56 opposed to a similar annular clutch engaging face 57 on the flywheel 41. A plurality of spaced coiled springs, one of which is shown at 60, are respectively compressed between seats on the plates 48 and 55 to urge the plate 55 towards the flywheel 41 into a clutch engaging position, as shown in Figure 1, and causing the fingers 36 to swing towards the bearing cup 19.

Splined to slide in driving relation with the shaft 43 is the clutch hub 62 that rotatably supports the annular clutch disc 63 to which are fastened the opposed clutch facings 64 located between the clutch faces 56 and 57. To facilitate a smooth engagement of the clutch, a plurality of coiled springs one of which is shown at 65, are respectively mounted within the adjacent slots 66 in the hub 62 and in the clutch disc 63, so that a slight rotary cushioned movement may exist between the disc 63 and the shaft 43 when the facings 64 are initially clamped between the clutch driving faces 56 and 57, after which a positive driving relation will be maintained between the clutch disc 63 and the hub 62 through the compressed springs 65.

The cup 19 of the thrust bearing 10 has an inwardly extending wall 67 provided with an outwardly extending annular flange 68 which is transversely rounded and forms a reentrant substantially toroidal contour so that an axial movement of the thrust bearing 10 to the declutching position of Figure 2 will result in a smooth rocking movement of the substantially flat finger faces 69 on the reentrant flange 68 with a minimum of friction. The slots 30 which receive the sliding pins 28 are preferably made by a rotary cuttei of such diameter that the end walls 32 are substantially radial of the cone 11 for uniform abutting engagement with the pins 28 to secure the cone 11 from rotation on the hub 12, it being understood, of course, that these slots are of sufficient length to allow for the necessary swinging movement of the shifting fork 25 when the bearing is axially moved from the clutching position of Figure 1 to the declutching position of Figure 2.

A lubricant chamber 70 in the bearing 10 is closed at its forward end by the flanged wall 67, which closely overhangs the forward end of the cone 11 in closely spaced surrounding relation to the hub 12, and is closed at its rearward end by a cup shaped shield 71 which has a laterally extending annular flange 72 surrounding the hub 12 in closely spaced relation. If desired, the flange 72 may be slightly tapered to provide a capillary seal with the hub 12 in the same manner as disclosed in the United States Patent Number 2,000,276 issued to Crow on May 7, 1935. Similarly, if desired, the wall 67 may also be slightly angularly disposed to the forward end of the cone 11 and to the hub 12. The shield 71 is provided with an annular wall 73 which fits closely over the cup 19 and the forward peripheral rim 74 of the wall 72 is bent inwardly into embraced relation with a stepped portion 75 of the cup 19 to secure the shield in position.

I claim:

1. In a device of the character indicated, an antifriction bearing, a pair of relatively rotatable race rings in said bearing, a substantially radially disposed annular wall on one of said rings, and a transversely curved reentrant annular flange laterally extending from said wall; substantially as described.

2. In an antifriction bearing, relatively rotatable inner and outer race rings, an annular flange on the outer ring extending beyond one end of the inner ring and terminating in a radial wall in closely spaced relation to said end of the inner race ring, and a toroidally shaped portion on said flange extending beyond the sides of said radial wall; substantially as described.

3. In an antifriction thrust bearing, coaxial inner and outer race rings, one end of the inner ring axially extending from the outer ring and having a pair of circumferentially aligned opposed slots cut therethrough, a radial wall on the outer ring overhanging the other end of the inner ring, and an annular flange laterally extending beyond said end wall and having a reentrant toroidal face; substantially as described.

4. In a clutch, a non-rotatable hub, a unit-handling antifriction bearing provided with inner and outer race rings, the inner race ring being rotatably and slidably mounted on the hub, one end of said inner ring axially extending beyond said outer ring and having circumferentially aligned diametrically opposed slots, an operating lever slidably socketed in the slots for slidably positioning the bearing on the hub and for limiting rotation of said inner race ring, an annular flange having a reentrantly curved portion enclosing the other end of said inner ring in closely spaced relation, and a clutch operating finger for rocking engagement with the reentrantly curved portion; substantially as described.

FRANK C. PEARSON.